(12) United States Patent
Engelbrecht et al.

(10) Patent No.: US 9,528,169 B2
(45) Date of Patent: Dec. 27, 2016

(54) METHOD FOR SEPARATION OF CHEMICALLY PURE OS FROM METAL MIXTURES

(71) Applicant: The Curators of the University of Missouri, Columbia, MO (US)

(72) Inventors: Hendrik P. Engelbrecht, Columbia, MO (US); Cathy S. Cutler, Columbia, MO (US); Leonard Manson, Columbia, MO (US); Stacy Lynn Wilder, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 60 days.

(21) Appl. No.: 14/336,767

(22) Filed: Jul. 21, 2014

(65) Prior Publication Data

US 2014/0328736 A1   Nov. 6, 2014

Related U.S. Application Data

(63) Continuation-in-part of application No. 13/566,447, filed on Aug. 3, 2012, now abandoned.

(60) Provisional application No. 61/514,534, filed on Aug. 3, 2011.

(51) Int. Cl.
| | | |
|---|---|---|
| C22B 11/00 | (2006.01) | |
| C22B 3/00 | (2006.01) | |
| C22B 61/00 | (2006.01) | |
| C01G 47/00 | (2006.01) | |
| C01G 55/00 | (2006.01) | |
| G21G 1/00 | (2006.01) | |
| G21G 1/10 | (2006.01) | |

(52) U.S. Cl.
CPC ............. *C22B 11/042* (2013.01); *C01G 47/00* (2013.01); *C01G 55/00* (2013.01); *C01G 55/004* (2013.01); *C22B 11/04* (2013.01); *C22B 61/00* (2013.01); *G21G 1/001* (2013.01); *G21G 1/10* (2013.01); *G21G 2001/0073* (2013.01); *Y02P 10/214* (2015.11)

(58) Field of Classification Search
None
See application file for complete search history.

(56) References Cited

U.S. PATENT DOCUMENTS

| | | | | |
|---|---|---|---|---|
| 2,049,488 A * | 8/1936 | Braun | ............... | C01G 55/001 |
| | | | | 423/22 |
| 2,813,130 A * | 11/1957 | Keeler | ............... | B01J 23/96 |
| | | | | 252/186.43 |
| 3,536,479 A * | 10/1970 | Manson | ............... | C22B 11/04 |
| | | | | 423/22 |
| 3,927,168 A * | 12/1975 | Whitehead | ............... | B01J 23/96 |
| | | | | 423/22 |
| 3,997,337 A * | 12/1976 | Pittie | ............... | C01G 5/003 |
| | | | | 423/22 |
| 4,683,123 A * | 7/1987 | Knapp, Jr. | ............... | G21G 4/08 |
| | | | | 250/432 PD |
| 5,215,575 A * | 6/1993 | Butler | ............... | C22B 3/04 |
| | | | | 423/22 |
| 6,475,449 B2 * | 11/2002 | Grehl | ............... | C01G 55/00 |
| | | | | 423/22 |
| 7,592,153 B2 * | 9/2009 | Hainfeld | ............... | B82Y 5/00 |
| | | | | 435/168 |
| 7,858,061 B2 * | 12/2010 | Varma | ............... | B01D 53/64 |
| | | | | 423/215.5 |
| 2009/0191106 A1 * | 7/2009 | Meyer | ............... | C01G 55/004 |
| | | | | 423/22 |

* cited by examiner

*Primary Examiner* — Steven Bos
(74) *Attorney, Agent, or Firm* — Polsinelli PC

(57) ABSTRACT

A method for separating an amount of osmium from a mixture containing the osmium and at least one other additional metal is provided. In particular, method for forming and trapping $OsO_4$ to separate the osmium from a mixture containing the osmium and at least one other additional metal is provided.

23 Claims, 4 Drawing Sheets

METHOD FOR SEPARATION OF CHEMICALLY PURE OS FROM METAL MIXTURES

CROSS REFERENCE TO RELATED APPLICATIONS

This application is a continuation-in-part of and claims the priority of U.S. non-provisional application Ser. No. 13/566,447, filed Aug. 3, 2012 which claims claims the priority of U.S. provisional application Ser. No. 61/514,534, filed Aug. 3, 2011, each of which is hereby incorporated by reference in its entirety.

FIELD OF THE INVENTION

This application relates to methods of separating osmium from a mixture that includes the osmium and at least one additional metal. More specifically, this application relates to a method of oxidizing, selectively removing or distilling, trapping, and precipitating chemically pure osmium from a mixture that includes the osmium and at least one additional metal.

BACKGROUND OF THE INVENTION

Osmium is an element with numerous useful physical and chemical properties. Osmium is the densest known element and possesses an extremely high hardness comparable to diamond. Wear-resistant osmium alloys are used in the construction of many devices such as fountain pen tips and electrical contacts. Osmium is also used as a contrast agent for staining and fixing lipids prior to visualization using transmission electron microscopy.

Osmium is also a useful material in the production of radioisotopes. Osmium-192 or osmium-189 may also be irradiated on a cyclotron to produce Re-186, a radioisotope with many potential applications to nuclear imaging methods and therapeutic compositions. Osmium-190 may be irradiated in a thermal neutron flux to produce the radioactive isotope Os-191. Os-191 decays to Ir-191$^m$, another radioisotope that is an excellent source of x-rays. Os-191/Ir-191$^m$ radioisotope generation systems may be used to provide Ir-191$^m$ radioisotope for dynamic radiotracer studies such as angiography.

Due to the toxicity of osmium, medical technologies that make use of osmium are limited in the amount of osmium they may use. In order to minimize the amount of osmium necessary to achieve the desired effect, a higher purity of osmium may be desirable. Existing techniques of producing chemically pure osmium typically involve nitric acid oxidation of a mixture containing the osmium and the fusion of the Os metal with $KNO_3$/KOH at high temperatures. Unless the mixture is made up of finely divided particles, the nitric acid oxidation may be a lengthy process. During the purification of osmium radioisotopes, the lengthy process times may expose technicians to extensive dosages of hazardous ionizing radiation.

A need in the art exists for a method of separating an amount of osmium from a mixture of the osmium and at least one other metal in a relatively short time compared to existing methods without need for high temperatures. Such a process may be used to produce chemically pure osmium samples in a shorter time using relatively simple chemical reactions and equipment. The shortened process times further limit the exposure of technicians to potentially hazardous conditions, particularly in the production of chemically pure osmium radioisotopes.

SUMMARY OF INVENTION

In one aspect, a method of separating an amount of osmium from a mixture that includes the osmium and at least one additional metal is provided. This method includes contacting the mixture with an oxidizing solution to form a volatile $OsO_4$ vapor and bubbling the $OsO_4$ vapor through a KOH trapping solution to form an amount of $K_2[OsO_4(OH)_2]$ dissolved in the KOH trapping solution. This method further includes contacting the dissolved $K_2[OsO_4(OH)_2]$ with a reducing agent to form an Os precipitate and separating the Os precipitate from the KOH trapping solution. The mixture may be an irradiated osmium metal target that includes at least one osmium isotope selected from the group consisting of Os-184, Os-186, Os-187, Os-188, Os-189, Os-190, Os-192, and any combination thereof. The mixture may be an irradiated osmium metal target that includes at least one of Os-189 and/or Os-192, and the at least one additional metal may include at least one of Re-186, Ir-186, IR-187, Ir-188, and/or Ir-190. The oxidizing solution may include an aqueous solution of an oxidizing agent chosen from NaClO, LiClO, KClO, $NaIO_4$, $Na_2S_4O_8$, $XeO_3$, $NaClO_2$, $NaClO_3$, $NaClO_4$, NaOH in contact with $Cl_2$ gas, other alkali salts of ClO, $ClO_2$, $ClO_3$ and/or $ClO_4$. The oxidizing solution may be an aqueous solution of NaClO at a concentration of about 12% available chlorine. The mixture may be contacted with the oxidizing solution in an impinger device. The mixture may be contacted with the oxidizing solution at a temperature of about 40° C. until the mixture is dissolved, and the dissolved mixture may be contacted with the oxidizing solution at a temperature of about 90° C. The KOH trapping solution may include an aqueous solution of KOH at a concentration of about 25% w/v. The KOH trapping solution may be maintained at a temperature of less than about 5° C. The reducing agent may be chosen from absolute ethanol, Zn shavings, Al shavings, Mg shavings, $NaBH_4$, NaHS, $H_2S$ gas, $Na_2S_2O_3$, UV light, phosphine ligands, hydrazine, hydroquinone, hydrophosphorous acid, formaldehyde, hydroxylamine, and citrate. The reducing agent may be absolute ethanol at a concentration of 5% v/v and the Os precipitate may be $K_2[OsO_2(OH)_4]$. The reducing agent may be a mixture of Zn shavings and Al shavings, and the Os precipitate may be Os metal. The reducing agent is chosen from Zn shavings, Mg shavings, and Al shavings, the reducing agent is contacted with the dissolved $K_2[OsO_4(OH)_2]$ in combination with HCl, and the Os precipitate may be Os metal. The reducing agent may be $NaBH_4$ and the Os precipitate may be Os metal. The reducing agent may be chosen from NaHS, $H_2S$ gas, $Na_2S_2O_3$ and the Os precipitate may be $OsS_2$. The remaining mixture in the oxidizing solution may be contacted with a reducing agent to form an osmium-free mixture that may include the at least one additional metal.

In another aspect, a method of separating an amount of osmium from a mixture that includes the amount of osmium and at least one additional metal is provided. This method includes contacting the mixture with an aqueous solution of NaClO at a concentration of about 12% available chlorine to form a volatile $OsO_4$ vapor and bubbling the $OsO_4$ vapor through a trapping solution that includes an aqueous solution of KOH at a concentration of about 25% w/v to form an amount of dissolved $K_2[OsO_4(OH)_2]$. This method further includes contacting the dissolved $K_2[OsO_4(OH)_2]$ with an aqueous solution of NaHS at a concentration of about 10% w/v to form an $OsS_2$ precipitate. In addition, this method includes washing the $OsS_2$ precipitate by agitating with water, separating the $OsS_2$ precipitate from the KOH trapping solution by centrifuging, rinsing the $OsS_2$ precipitate with acetone or other organic solvents to further remove the water from the precipitate, and drying the $OsS_2$ precipitate. The mixture may be an irradiated osmium metal target that includes at least one osmium isotope selected from the group consisting of Os-184, Os-186, Os-187, Os-188, Os-189, Os-190, Os-192, and any combination thereof. The mixture may be an irradiated osmium metal target that includes at least one of Os-189 and/or Os-192, and the at least one additional metal may include at least one of Re-186, Ir-186, IR-187, Ir-188, and/or Ir-190. The mixture may be contacted with the aqueous solution of NaClO at a temperature of about 40° C. until completely dissolved, and the dissolved mixture may be contacted with the aqueous solution of NaClO at a temperature of about 90° C. The dissolved mixture may be contacted with the aqueous solution of NaClO until the aqueous solution of NaClO is colorless. The trapping solution may be situated within an ice bath while the dissolved $K_2[OsO_4(OH)_2]$ is forming.

In one aspect, a method of separating an amount of osmium from a mixture that includes the osmium and at least one additional metal is provided. This method includes contacting the mixture with an oxidizing solution to form a volatile $OsO_4$ vapor and bubbling the $OsO_4$ vapor through a KOH trapping solution to form an amount of $K_2[OsO_4(OH)_2]$ dissolved in the KOH trapping solution. This method further includes contacting the dissolved $K_2[OsO_4(OH)_2]$ with a reducing agent to form an Os precipitate and separating the Os precipitate from the KOH trapping solution. The mixture may be an irradiated osmium metal target that includes at least one osmium isotope selected from the group consisting of Os-184, Os-186, Os-187, Os-188, Os-189, Os-190, Os-192, and any combination thereof. The mixture may be an irradiated osmium metal target that includes at least one of Os-189 and/or Os-192, and the at least one additional metal may include at least one of Re-186, Ir-186, IR-187, Ir-188, and/or Ir-190. The mixture may be contacted with the aqueous solution of NaClO at a temperature of about 40° C. until completely dissolved, and the dissolved mixture may be contacted with the aqueous solution of NaClO at a temperature of about 90° C. The dissolved mixture may be contacted with the aqueous solution of NaClO until the aqueous solution of NaClO is colorless. The trapping solution may be situated within an ice bath while the dissolved $K_2[OsO_4(OH)_2]$ is forming.

In an additional aspect, a method of producing an amount of chemically pure Re-186 isotope is provided. This method includes irradiating a metal target that includes an amount of isotopically enriched osmium isotope consisting of Os-189, Os-192, or any combination thereof in a thermal proton flux to form a mixture that includes at least one osmium isotope and at least one additional metal that may include the Re-186 isotope. The method also includes contacting the mixture with an oxidizing solution to form a volatile $OsO_4$ vapor comprising the at least one osmium isotope, distilling the $OsO_4$ vapor out of the oxidizing solution to form a second solution comprising the Re-186 dissolved in the oxidizing solution, and separating the Re-186 isotope from the second solution. The Re-186 isotope may be separated from the second solution using a method chosen from: contacting the second solution with a reducing agent, contacting the second solution with a chromatographic column, and electroplating the at least one metal from the second solution. The Re-186 isotope may be separated from the second solution by contacting the second solution with an alumina chromatographic column and eluting the Re-186 using a saline solution In one aspect, a method of separating an amount of osmium from a mixture that includes the osmium and at least one additional metal is provided. This method includes contacting the mixture with an oxidizing solution to form a volatile $OsO_4$ vapor and bubbling the $OsO_4$ vapor through a KOH trapping solution to form an amount of $K_2[OsO_4(OH)_2]$ dissolved in the KOH trapping solution. This method further includes contacting the dissolved $K_2[OsO_4(OH)_2]$ with a reducing agent to form an Os precipitate and separating the Os precipitate from the KOH trapping solution. The mixture may be an irradiated osmium metal target that includes at least one osmium isotope selected from the group consisting of Os-184, Os-186, Os-187, Os-188, Os-189, Os-190, Os-192, and any combination thereof. The mixture may be an irradiated Os-190 metal target, the amount of osmium includes an amount of Os-191, and the at least one additional metal is chosen from Ir-192, Ir-193, Ir-194, Pt-192, and/or Pt-194. The oxidizing solution may include an aqueous solution of an oxidizing agent chosen from NaClO, LiClO, KClO, NaIO$_4$, Na$_2$S$_4$O$_8$, XeO$_3$, NaClO$_2$, NaClO$_3$, NaClO$_4$, NaOH in contact with Cl$_2$ gas, other alkali salts of ClO, ClO$_2$, ClO$_3$ and/or ClO$_4$. The oxidizing solution may be an aqueous solution of NaClO at a concentration of about 12% available chlorine. The mixture may be contacted with the oxidizing solution in an impinger device. The mixture may be contacted with the oxidizing solution at a temperature of about 40° C. until the mixture is dissolved, and the dissolved mixture may be contacted with the oxidizing solution at a temperature of about 90° C. The KOH trapping solution may include an aqueous solution of KOH at a concentration of about 25% w/v. The KOH trapping solution may be maintained at a temperature of less than about 5° C. The reducing agent may be chosen from absolute ethanol, Zn shavings, Al shavings, Mg shavings, NaBH$_4$, NaHS, H$_2$S gas, Na$_2$S$_2$O$_3$, UV light, phosphine ligands, hydrazine, hydroquinone, hydrophosphorous acid, formaldehyde, hydroxylamine, and citrate. The reducing agent may be absolute ethanol at a concentration of 5% v/v and the Os precipitate may be $K_2[OsO_2(OH)_4]$. The reducing agent may be a mixture of Zn shavings and Al shavings, and the Os precipitate may be Os metal. The reducing agent is chosen from Zn shavings, Mg shavings, and Al shavings, the reducing agent is contacted with the dissolved $K_2[OsO_4(OH)_2]$ in combination with HCl, and the Os precipitate may be Os metal. The reducing agent may be NaBH$_4$ and the Os precipitate may be Os metal. The reducing agent may be chosen from NaHS, H$_2$S gas, Na$_2$S$_2$O$_3$ and the Os precipitate may be OsS$_2$. The remaining mixture in the oxidizing solution may be contacted with a reducing agent to form an osmium-free mixture that may include the at least one additional metal.

In another aspect, a method of separating an amount of osmium from a mixture that includes the amount of osmium and at least one additional metal is provided. This method includes contacting the mixture with an aqueous solution of NaClO at a concentration of about 12% available chlorine to form a volatile $OsO_4$ vapor and bubbling the $OsO_4$ vapor through a trapping solution that includes an aqueous solution of KOH at a concentration of about 25% w/v to form an amount of dissolved $K_2[OsO_4(OH)_2]$. This method further includes contacting the dissolved $K_2[OsO_4(OH)_2]$ with an aqueous solution of NaHS at a concentration of about 10% w/v to form an $OsS_2$ precipitate. In addition, this method includes washing the $OsS_2$ precipitate by agitating with water, separating the $OsS_2$ precipitate from the KOH trapping solution by centrifuging, rinsing the $OsS_2$ precipitate with acetone or other organic solvents to further remove the water from the precipitate, and drying the $OsS_2$ precipitate. The mixture may be an irradiated osmium metal target that includes at least one osmium isotope selected from the group consisting of Os-184, Os-186, Os-187, Os-188, Os-189, Os-190, Os-192, and any combination thereof. The mixture may be an irradiated Os-190 metal target, the amount of osmium includes an amount of Os-191, and the at least one additional metal is chosen from Ir-192, Ir-193, Ir-194, Pt-192, and/or Pt-194. The mixture may be contacted with the aqueous solution of NaClO at a temperature of about 40° C. until completely dissolved, and the dissolved mixture may be contacted with the aqueous solution of NaClO at a temperature of about 90° C. The dissolved mixture may be contacted with the aqueous solution of NaClO until the aqueous solution of NaClO is colorless. The trapping solution may be situated within an ice bath while the dissolved $K_2[OsO_4(OH)_2]$ is forming.

In an additional aspect, a method of producing an amount of chemically pure Os-191 isotope is provided. This method includes irradiating a metal target that includes an amount of isotopically enriched Os-190 metal in a thermal neutron flux to form a mixture that includes Os-191 isotope and at least one additional metal chosen from Ir-192, Ir-193, Ir-194, Pt-192, Pt-194, and combinations thereof. The method also includes contacting the mixture with an aqueous solution of NaClO at a concentration of about 12% available chlorine to form a volatile $OsO_4$ vapor comprising Os-191, as well as bubbling the $OsO_4$ vapor through a trapping solution that includes an aqueous solution of KOH at a concentration of about 25% w/v to form an amount of dissolved $K_2[OsO_4(OH)_2]$ that contains the Os-191. The method also includes contacting the dissolved $K_2[OsO_4(OH)_2]$ with an aqueous solution of NaHS at a concentration of about 10% w/v to form an $OsS_2$ precipitate containing the Os-191. Further included in the method is washing the resulting $OsS_2$ precipitate by agitating with water, separating the washed $OsS_2$ precipitate from the KOH trapping solution by centrifuging, rinsing the separated $OsS_2$ precipitate with acetone, and drying the rinsed $OsS_2$ precipitate.

In another additional aspect, a method of removing an osmium impurity from a mixture comprising the osmium impurity and at least one additional metal is provided. This method includes contacting the mixture with an oxidizing solution to form a volatile $OsO_4$ vapor and distilling the $OsO_4$ vapor out of the oxidizing solution to form a second solution that includes the at least one additional metal dissolved in the oxidizing solution. The method further includes separating the at least one additional metal from the second solution. The at least one additional metal may be separated from the second solution using a method chosen from contacting the second solution with a reducing agent, contacting the second solution with a chromatographic column, and electroplating the at least one metal from the second solution.

Various aspects of the separation method overcome many of the limitations of existing osmium separation methods. The use of oxidizing solutions such as aqueous solutions of NaClO results in considerably shorter reaction times compared to existing methods. The KOH trapping solution does not require high temperature conditions, unlike existing osmium separation methods. Various aspects of this method of separating osmium may be performed in a relatively short time using simple equipment and readily available materials compared to existing methods. Further, the simple equipment may be housed within a shielded glove box or hot cell, minimizing the exposure of workers to radiation and limiting the possibility of inadvertent environmental release of osmium.

Other aspects and iterations of the embodiments are described in detail below.

DESCRIPTION OF FIGURES

The following figures illustrate various aspects of the embodiments.

Corresponding reference characters and labels indicate corresponding elements among the views of the drawings. The headings used in the figures should not be interpreted to limit the scope of the claims.

DETAILED DESCRIPTION

I. Overview of Method

Various aspects provide methods of separating osmium from a mixture of metals including the osmium as well as at least one other metal. These methods may be used to produce chemically pure osmium or to remove osmium impurities from a mixture that includes the osmium and at least one other metal. In an aspect, the chemically pure osmium may be a radioisotope. In another aspect, the chemically pure osmium may be used as an isotopically-enriched osmium target to produce radioisotopes by irradiation of the osmium target in an irradiation source including, but not limited to, a thermal neutron flux, a cyclotron, or a linear accelerator. The osmium target may be irradiated by any known type of irradiation, including, but not limited to: proton irradiation, neutron irradiation, deuteron irradiation, alpha particle irradiation, and any other known type of irradiation.

Figure 1:
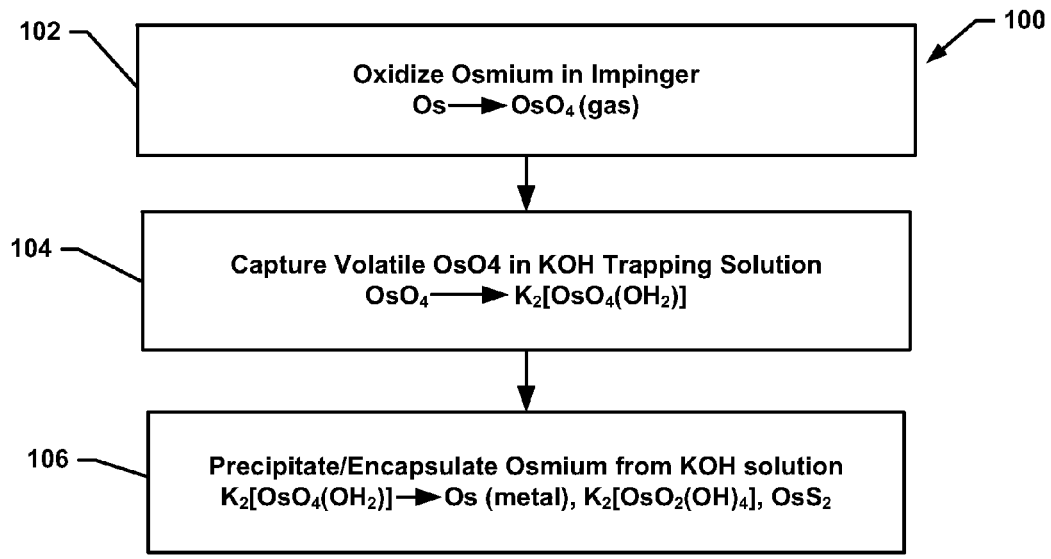
FIG. 1 is a flow chart illustrating a method of separating chemically pure osmium from a mixture.

A flowchart describing an aspect of a method 100 is provided in FIG. 1. In this aspect, the osmium within the mixture is oxidized in an oxidizing solution within an impinger to produce gaseous $OsO_4$ vapor at step 102. The $OsO_4$ vapor is bubbled through a KOH trapping solution at step 104, where the $OsO_4$ reacts with the KOH in the trapping solution to form dissolved $K_2[OsO_4(OH)_2]$. The $K_2[OsO_4(OH)_2]$ is then contacted with a reducing agent at step 106 to form an osmium-containing precipitate. Non-limiting examples of osmium-containing precipitate include osmium metal, $OsO_2$, $OsS_2$, $K_2[OsO_2(OH)_4]$, and any combination thereof.

The mixture may include a variety of radioactive and non-radioactive isotopes. Non-limiting examples of metals that may be included in the mixture include lanthanide metals, transition metals, alkali metals, and metals from the platinum family. Non-limiting examples of specific metal elements that may be included with osmium in a mixture include Rh, Pd, Ir, Pt, Sc, Ti, V, Cr, Mn, Fe, Co, Ni, Cu, Y, Zr, Nb, Mo, Tc, Ag, Cd, La, Hf, Ta, W, Re, Au, Hg, Ac, Rf, Db, Sg, Bh, Hs, Mt, Ds, Rg, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No, Lr, and any combination thereof. In an aspect, the mixture may result from the irradiation of an enriched Os-190 target by a thermal neutron stream and may include Os-191, Os-191$^m$, Ir-191$^m$, Ir-191, Ir-192$^m$, Ir-192, Ir-193, Ir-194, Pt-192, Pt-194, and combinations thereof. In another aspect, enriched Os-190 may be irradiated in a cyclotron to produce a mixture that may include Pt-188, Pt-189, Pt-191, Pt-193m, Pt-195m, and combinations thereof. In an additional aspect, enriched Os-190 may be irradiated in a cyclotron to produce a mixture that may include Re-186, an isotope with at least several potential applications including but not limited to nuclear imaging methods and therapeutic compositions.

In other aspects, the mixture may result from the irradiation of any enriched Os isotope target without limitation. Non-limiting examples of Os isotopes suitable for inclusion in an enriched Os isotope target include Os-184, Os-186, Os-187, Os-188, Os-189, Os-190, and Os-192. In one aspect, the mixture may result from the proton irradiation of an enriched Os-189 and/or Os-192 target to produce a mixture that may include Re-186.

Other aspects of methods of separating osmium from a mixture of metals are described in detail below.

II. Oxidation of Osmium

In various aspects, the osmium within a mixture may be separated from a mixture that includes the osmium and at least one other metal by contacting the mixture with an oxidizing agent to form a volatile $OsO_4$ vapor. In an aspect, the oxidizing agent may be any compound capable of oxidizing the osmium into $OsO_4$ in aqueous solution. In another aspect, a relatively strong oxidizing agent may be selected to reduce the overall time to separate the osmium from the mixture and to provide the capability to oxidize the osmium from mixtures in any form including, but not limited to: finely divided powders, shavings, pellets, slugs, and any combination thereof.

Non-limiting examples of suitable oxidizing agents include NaClO, LiClO, KClO, NalO$_4$, Na$_2$S$_4$O$_8$, XeO$_3$, NaClO$_2$, NaClO$_3$, NaClO$_4$, NaOH in contact with Cl$_2$ gas, other alkali salts of ClO, ClO$_2$, ClO$_3$ and ClO$_4$, and combinations thereof. The concentration of the oxidizing agent in an aqueous solution may range from about 5% to about 30% available chlorine. The concentration of oxidizing agent may be selected based on any one or more of at least several factors including, but not limited to: the composition of the mixture, the availability of the oxidizing agent, the safety and ease of use of the oxidizing agent, the temperature and other reaction conditions of the mixture and the oxidizing agent, and the solubility of the oxidizing agent.

The temperature at which the mixture is contacted with the oxidizing agent may range from about 20° C. to about 95° C. The temperature may be selected to result in a relatively rapid but controlled reaction rate without causing the aqueous solution containing the oxidizing agent to boil. In an aspect, the oxidizing agent is NaClO in aqueous solution at a concentration of about 12% available chlorine, and the NaClO solution is contacted with the mixture at a temperature of about 40° C.

In another aspect, the oxidizing solution may be maintained at a temperature of about 40° C. until the mixture containing the osmium and other metals is completely dissolved, and the oxidizing solution may be maintained at a temperature of about 90° C. for the remainder of the reaction. As the mixture containing the osmium and other metals dissolves within the oxidizing solution, the solution may take on a yellowish colored appearance as the osmium is oxidized within the oxidizing solution. As the dissolved $OsO_4$ is distilled out of the oxidizing solution, the oxidizing solution takes on a transparent white appearance. In an aspect, a colored oxidizing solution containing the dissolved mixture of metals may be maintained at a temperature of about 90° C. until the oxidizing solution again takes on a transparent appearance, indicating that essentially all osmium in the solution has been oxidized and distilled away.

Figure 2:
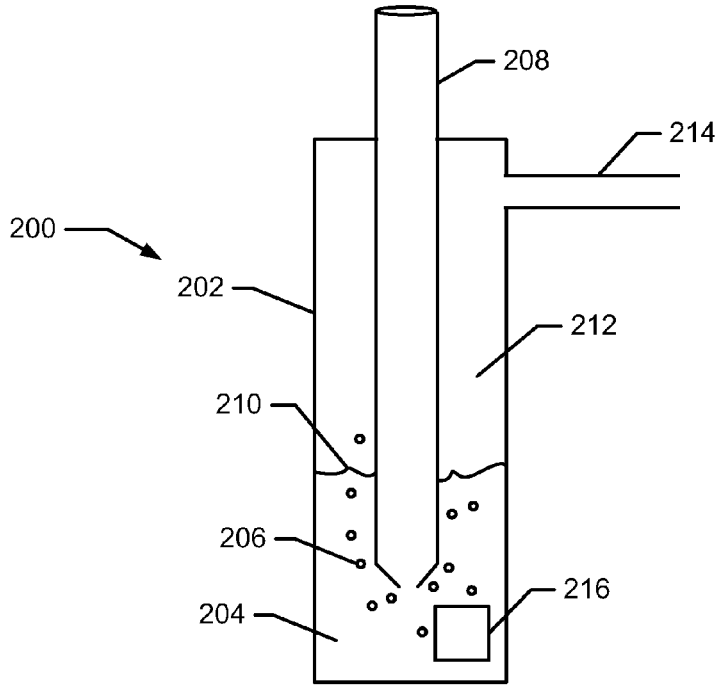
FIG. 2 is schematic illustration of an impinger.

In various aspects, the mixture is contacted with the oxidizing agent in an impinger, shown schematically in FIG. 2. In this aspect, the impinger 200 includes a closed vessel 202 containing the oxidizing solution 204. In use, the mixture 216 and oxidizing solution 204 are placed into the impinger 200. A gas is introduced into the impinger 200 via an impinger inlet 208, which bubbles through the oxidizing solution 204, causing the mixing of the contents of the impinger 200.

As the oxidizing solution 204 contacts the mixture 216, the osmium within the mixture may be converted into $OsO_4$ vapor. This $OsO_4$ vapor may form into bubbles 206 that may float to the surface 210 of the oxidizing solution 204, where the $OsO_4$ vapor is released into the headspace 212 of the impinger 200. Driven by the building pressure of the gases introduced into the impinger 200, the gases within the headspace 212, which may include $OsO_4$ vapor, exit the impinger 200 via the impinger exit 214.

The gas that is introduced into the impinger 200 may be any gas that does not interfere with the reaction between the mixture and the oxidizing solution including, but not limited to: air, oxygen, nitrogen, noble gases, and combinations thereof. In an aspect, the gas is selected to be a non-toxic gas capable of being vented to the environment after the $OsO_4$ has been extracted as described herein below. Non-limiting examples of gases suitable for introduction into the impinger 200 include nitrogen, argon, helium, oxygen, and combinations thereof. In another aspect, the gas introduced into the impinger 200 is nitrogen.

The gas may be introduced at any suitable rate that results in the vigorous mixing of the mixture and the oxidizing solution, so long as the rate does force the venting of any oxidizing solution through the impinger exit 214. The source of the gas may be the atmosphere outside of the impinger 200, or the gas source may be a pressurized tank or any other existing gas source. In other aspects, the rate of introduction of the gas into the impinger 200 may be limited by the design and performance capabilities of the impinger 200, as well as the design and performance capability of other components downstream of the impinger 200, such as the trapping vessel, described in detail herein below.

III Capture of $OsO_4$ in Trapping Solution

In various embodiments, the $OsO_4$ vapor may be bubbled through a KOH trapping solution to form an amount of K$_2$[OsO$_4$(OH)$_2$] dissolved within the trapping solution. In an aspect, the KOH trapping solution comprises an aqueous solution of KOH at a concentration ranging from about 10% to about 50% w/v. The concentration of the KOH may be selected based on any one or more of at least several factors including, but not limited to: the rate and concentration at which the $OsO_4$ vapor is bubbled through the KOH trapping solution, the reaction conditions such as temperature of the KOH trapping solution, and the solubility of the KOH in the aqueous solvent. In an aspect, the KOH trapping solution is an aqueous solution of KOH at a concentration of about 25% w/v at a temperature of less than about 5° C.

In another embodiment, a trap vessel containing the KOH trapping solution is situated within an ice bath. Without being bound to any particular theory, the reduction of the $OsO_4$ vapor within the KOH trapping solution is an exothermic reaction. Cooling the KOH trapping solution to a lower temperature using an ice bath maintains the KOH trapping solution at a higher solubility for the $OsO_4$ vapor.

Figure 3:
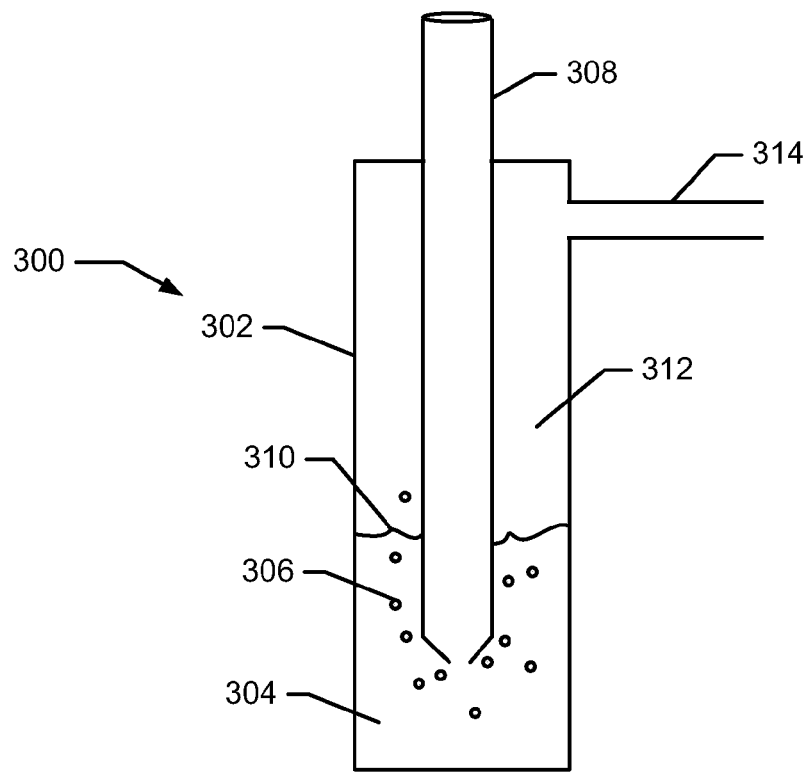
FIG. 3 is a schematic illustration of a capture vessel.

FIG. 3 is a schematic illustration of a trap vessel 300 in one aspect. In this aspect, the trap vessel 300 may be any closed vessel 302 containing an amount of KOH trapping solution 304. The gas exiting the impinger 200, which may contain $OsO_4$ vapor, is directed into the trap inlet 308, which bubbles the gas through the KOH trapping solution 304. The gas bubbles impart mixing of the gas and the KOH trapping solution 304, as well as promote the intimate contact of the $OsO_4$ vapor with the KOH within the trapping solution 304. The bubbles 306 exit the surface 310 of the trapping solution 304 into the trap headspace 312. Gas within the trap headspace 312 is forced from the trap vessel 300 by the continuous introduction of additional gases through the trap inlet 308. The headspace gas, which may contain a lower concentration of $OsO_4$ vapor than the gas entering the trap inlet 308, may exit the trap vessel 300 through the trap exit 314.

The concentration of $OsO_4$ vapor exiting the trap vessel 300 through the trap exit 314 may be less than about 20% of the concentration of the $OsO_4$ vapor entering the vessel 300 through the trap inlet 308. The degree of reduction of $OsO_4$ vapor concentration may be governed by the effectiveness the reaction between the $OsO_4$ and the KOH in the trapping solution 312. The effectiveness of the reaction may depend on any one or more of at least several factors including, but not limited, to: the concentration of KOH in the trapping solution 304, the reaction conditions such as temperature and pressure within the trap vessel 300, the rate of gas introduction into the trap vessel 300, and the design of the trap vessel 300. In other aspects, the concentration of $OsO_4$ vapor exiting the trap vessel 300 through the trap exit 314 may be less than about 10%, less than about 5%, less than about 1%, or less than about 0.1% of the concentration of the $OsO_4$ vapor entering the vessel 300 through the trap inlet 308.

Figure 4:
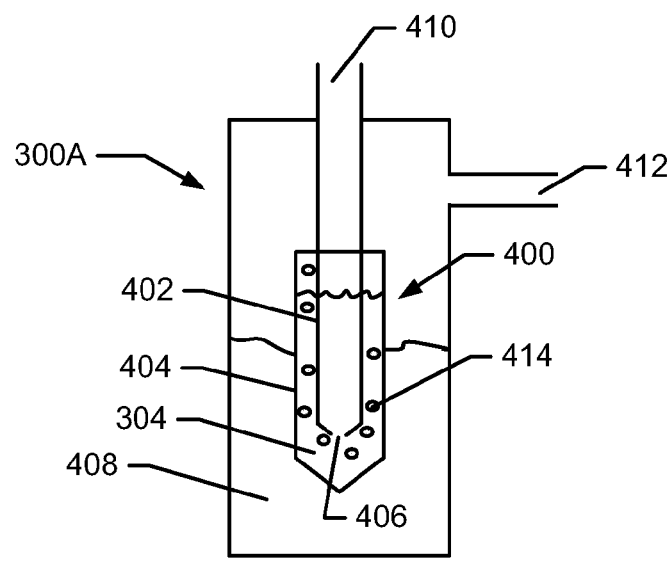
FIG. 4 is a schematic illustration of a capture vessel with a dual-tip pipette.

In another aspect, the trap vessel 300 may include a two-in-one pipette 400, shown schematically in FIG. 4. The two-in-one pipette 400 includes an inner pipette 402 situated within an outer pipette 404. The gas entering the trap vessel 300A via the pipette inlet 410 is released through the open tip 406 of the inner pipette 402. The released gas from the open tip 406 bubbles through a small amount of KOH trapping solution 304 contained within the outer pipette 404.

Without being tied to any particular theory, the introduction of the gas through the two-in-one pipette 400 imparts more intimate and sustained contact between the bubbles 414 and the trapping solution 304. The bubbles 414 may be distorted into larger surface areas, shaped by capillary forces imparted by the outer surface of the inner pipette 402 and the inner surface of the outer pipette 404. Further, these capillary forces may impede the free movement of the bubbles to the surface of the trapping solution 304, resulting in a sustained time of contact between the gas bubbles 414 and the trapping solution 304. This combination of factors may result in more efficient and extensive conversion of the $OsO_4$ vapor into $K_2[OsO_4(OH)_2]$ within the trapping solution 304. The two-in-one pipette 400 may be immersed in a liquid 408 to facilitate heat transfer from the pipette 400 to a heat sink such as an ice bath (not shown). The bubbles 414 may be released into the headspace 416 of the outer pipette 404 and may exit the two-in-one pipette 400 via a vapor outlet 412.

The rate at which gas from the impinger 200 is introduced into the trapping vessel 300 may depend on any one or more of at least several factors including, but not limited to: the rate at which gases exit the impinger 200, as well as the sizing and design of the trap vessel 300. The rate at which gases exit the impinger 200 may be governed by the rate at which gas is introduced into the impinger 200 as well as the rate of production of $OsO_4$ vapor within the oxidizing solution 204. The trap vessel 300 may be designed to have a volume that is larger relative to the impinger 200 in order to impart a lower flow velocity through the trap vessel 300. Alternatively, the gases exiting the impinger 200 may be directed into two or more trap vessels 300 attached in parallel, resulting in a larger overall trap vessel volume relative to the impinger 200.

Figure 5:
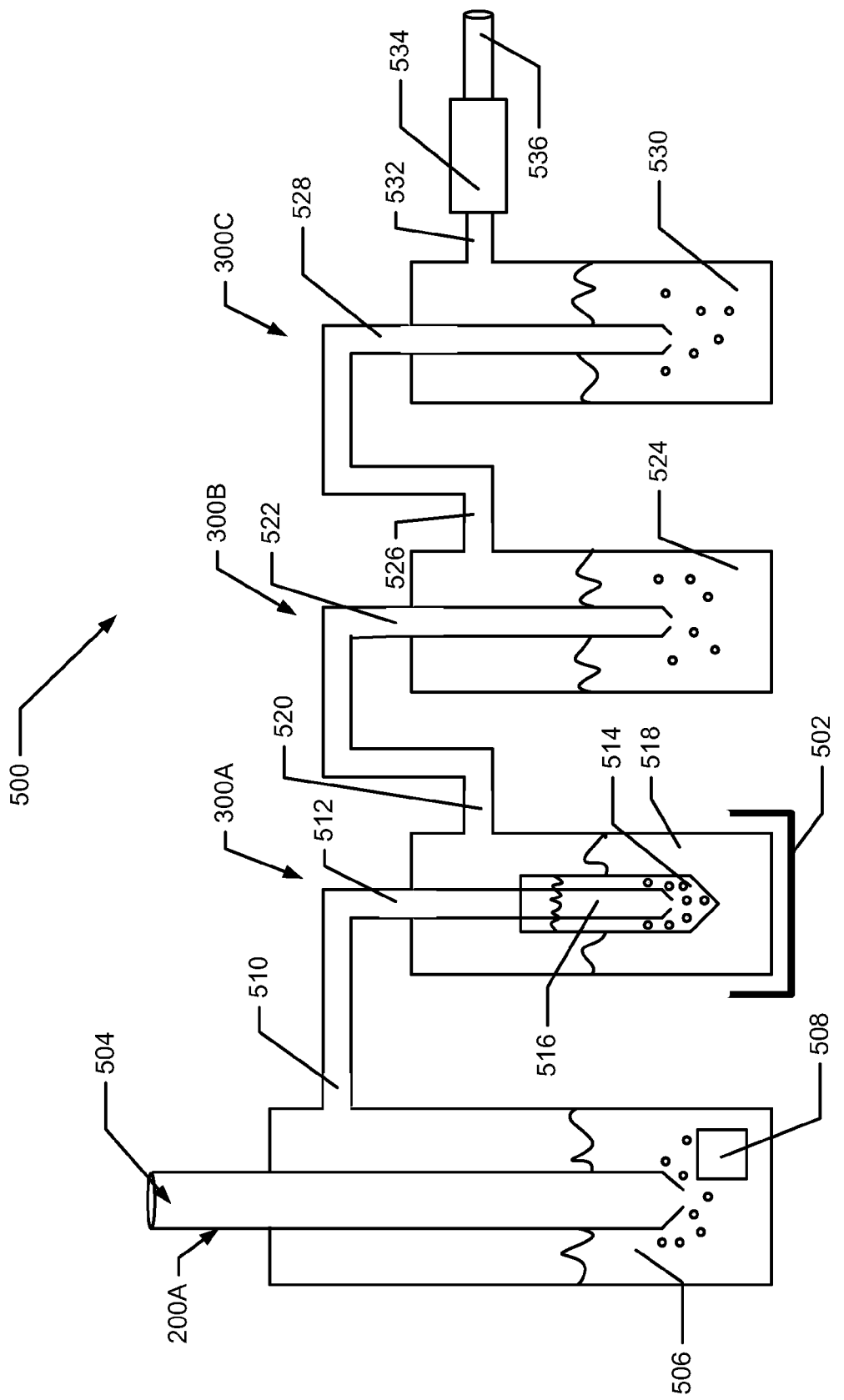
FIG. 5 is a schematic illustration of a system for separating chemically pure osmium from a mixture.

In another aspect, in order to trap a higher proportion of the $OsO_4$ vapor released by the impinger 200, two or more trap vessels may be connected in series to the impinger exit 214. FIG. 5 is a schematic illustration showing a series of trap vessels 300A, 300B, and 300C connected in series to the impinger 200A. If two or more trap vessels 300 are connected to the impinger exit 510 in parallel as described herein above, additional trap vessels may be connected in series to each of the trap vessels connected directly to the impinger. In yet another aspect, a final trapping filter 534, including but not limited to an adsorbent filter such as an activated charcoal filter, may be connected to the trap exit 532 of each final trap vessel 300C in each series of trap vessels.

IV. Precipitation/Encapsulation of Osmium from Trapping Solution

In various embodiments, the osmium trapped within the dissolved $K_2[OsO_4(OH)_2]$ in the KOH trapping solution may be precipitated and/or encapsulated into a usable form by contacting the dissolved $K_2[OsO_4(OH)_2]$ with a reducing agent to form an Os precipitate. The particular Os precipitate formed depends upon the species of reducing agent contacted with the dissolved $K_2[OsO_4(OH)_2]$. Non-limiting examples of Os precipitates include Os metal, $OsS_2$, $OsO_2$, and $K_2[OsO_2(OH)_4]$. Non-limiting examples of suitable species of reducing agents include absolute ethanol, Zn shavings, Al shavings, Mg shavings, $NaBH_4$ and other alkali salts of $BH_4$, NaHS, $H_2S$ gas, $Na_2S_2O_3$, UV light, phosphine ligands, hydrazine, hydroquinone, hydrophosphorous acid, formaldehyde, hydroxylamine, citrate, ascorbic acid, and hydrogen gas.

In one aspect, the Os is recovered from the KOH trapping solution by reducing the dissolved $K_2[OsO_4(OH)_2]$ to $K_2[OsO_2(OH)_4]$ crystals by adding an amount of absolute ethanol to the KOH trapping solution. In this embodiment, the concentration of the absolute ethanol added may range from about 1% to about 20% v/v. In another aspect, ethanol is added at a concentration of about 5% v/v. The $K_2[OsO_2(OH)_4]$ crystals may then be harvested for encapsulation.

In another aspect, Zn, Mg, or Al metal shavings may be added to the KOH trapping solution, and concentrated HCl may be added to the solution to lower the pH of the solution, resulting in the formation of Os metal. After removal of the shavings, the precipitate may be centrifuged and washed with water to isolate the Os metal.

In an additional aspect, Zn and Al shavings may be added to the basic KOH trapping solution to form a precipitate that may include Os metal, $OsO_2$, and combinations thereof. In another additional aspect, $NaBH_4$ may be added to the KOH trapping solution to form an Os metal precipitate or other reduced species of Os such as $OsO_2$. The precipitate may be centrifuged and washed with water to isolate the Os metal.

In yet another aspect, NaHS may be added to the KOH trapping solution in order to form an $OsS_2$ precipitate. The $OsS_2$ precipitate may also be formed by bubbling $H_2S$ gas through the KOH trapping solution. In addition, $Na_2S_2O_3$ may be added to either the basic or acidified KOH trapping solution to form an $OsS_2$ precipitate. The $OsS_2$ precipitate may be centrifuged and washed with water to isolate the $OsS_2$ precipitate.

In still yet another aspect, the osmium may be encapsulated by drawing an amount of the KOH trapping solution containing the $K_2[OsO_4(OH)_2]$ into a thin vial, followed by dipping the thin vial into an aqueous solution containing NaHS to form an encapsulated $OsS_2$ precipitate within the thin vial.

V. System for Separating Osmium from Mixtures of Other Metals

Various embodiments provide a system for the separation of osmium from a mixture including the osmium and at least one other metal. FIG. 5 is a schematic representation of an osmium separation system 500. The system 500 includes an impinger 200A and a series of trapping vessels 300A-300C that may include a first trapping vessel 300A in an ice bath 502, a second trapping vessel 300B, a third trapping vessel 300C, and an activated charcoal filter 534. The impinger exit 510 may be connected directly to the first trap inlet 512, the first trap exit 520 may be connected directly to the second trap inlet 522, the second trap exit 526 may be connected directly to the third trap inlet 528, and the third trap exit may be connected directly to the activated charcoal filter 534. The filter exit 536 may vent directly to the atmosphere. The elements of the system 500 form a continuous hydraulic path from the impinger inlet 504 to the filter exit 536, and the gases are impelled from the impinger 200A to the first trap vessel 300A due to the pressurization of the impinger 200A caused by the continuous introduction of gas into the impinger inlet 504.

In use, a mixture 508 that includes an amount of osmium and at least one other metal may be placed into the impinger 200A along with an amount of oxidizing solution 506. The oxidizing solution 506 may be maintained at about 40° C., and a moderate flow of nitrogen may be introduced into the impinger inlet 504, causing the agitation of the oxidizing solution 506 as well as the fluids within the downstream trap vessels 300A-300C. As the mixture 508 dissolves into the oxidizing solution 506, the oxidizing solution 506 may take on a colored appearance. Once the mixture has completely dissolved within the oxidizing solution 506, the temperature of the oxidizing solution 506 solution may be maintained at about 90° C. until all of the osmium in the oxidizing solution 506 has been oxidized into $OsO_4$ vapor. In an aspect, the color of the oxidizing solution 506 may change from colored to clear to indicate the oxidation of all dissolved osmium in the oxidizing solution 506.

The $OsO_4$ vapor formed in the impinger 200A may be carried along with the introduced nitrogen into the first trap vessel 300A. In an embodiment, the first trap vessel 300A includes a two-in-one pipette 516 containing an amount of KOH trapping solution 514. An amount of $OsO_4$ vapor bubbling through the KOH trapping solution 514 may contact the dissolved KOH, forming dissolved $K_2[OsO_4(OH)_2]$. The introduced nitrogen, along with any untrapped $OsO_4$ vapor may pass into the second trap vessel 300B, where an amount of $OsO_4$ may be captured within the second KOH trapping solution 524. Similarly, the introduced nitrogen, along with any further untrapped $OsO_4$ vapor, may pass into the third trap vessel 300C, where an amount of $OsO_4$ may be captured within the third KOH trapping solution 530. Any residual $OsO_4$ vapor leaving the third trap vessel 300C may be captured within the activated charcoal filter 534, and essentially osmium-free nitrogen may exit the filter exit 536 to the atmosphere.

Once essentially all of the dissolved osmium within the oxidizing solution 506 has been oxidized into $OsO_4$ vapor and bubbled through the trap vessels 300A-300C, the flow of nitrogen gas may be stopped and the dissolved $K_2[OsO_4(OH)_2]$ within the KOH trapping solution 514 may be precipitated into a useable form using any of the methods described herein previously. In an aspect, only dissolved $K_2[OsO_4(OH)_2]$ within the KOH trapping solution 514 from the first trap vessel 300A is precipitated. In another aspect, the trapping solutions 514, 524, and 530 may be combined and the dissolved $K_2[OsO_4(OH)_2]$ within the combined KOH trapping solutions may be precipitated.

In an aspect, the dissolved $K_2[OsO_4(OH)_2]$ within the combined KOH trapping solutions may be transferred into a centrifuge tube and combined with an amount of NaHS to form a black $OsS_2$ precipitate. The $OsS_2$ precipitate may be further treated after the addition of the NaHS, or the centrifuge tube may be left as long as about 6 hours to about 24 hours to ensure that the $K_2[OsO_4(OH)_2]$ has completely reacted with the NaHS. The $OsS_2$ precipitate in the centrifuge may be agitated with water, centrifuged, and the water supernate may be discarded. This washing process may be repeated two or more times to ensure that any remaining impurities are rinsed from the $OsS_2$ precipitate.

The water-rinsed $OsS_2$ precipitate may be additionally rinsed with a solvent such as acetone and dried at room temperature for about 1 hour.

Other Applications of Method

The osmium separation methods of various aspects may be applied in a variety of different contexts. As described herein above, one aspect of the method may be used to separate osmium isotopes or radioisotopes from a mixture including the osmium and at least one other metal. The resulting chemically pure osmium may be an enriched osmium target used for the production of radioisotopes, or the chemically pure osmium may be Os-191 or other Os radioisotopes used in a variety of applications including, but not limited to: a radiotracer composition, a radiotracer source, or as an ingredient in a therapeutic composition.

Figure 6:
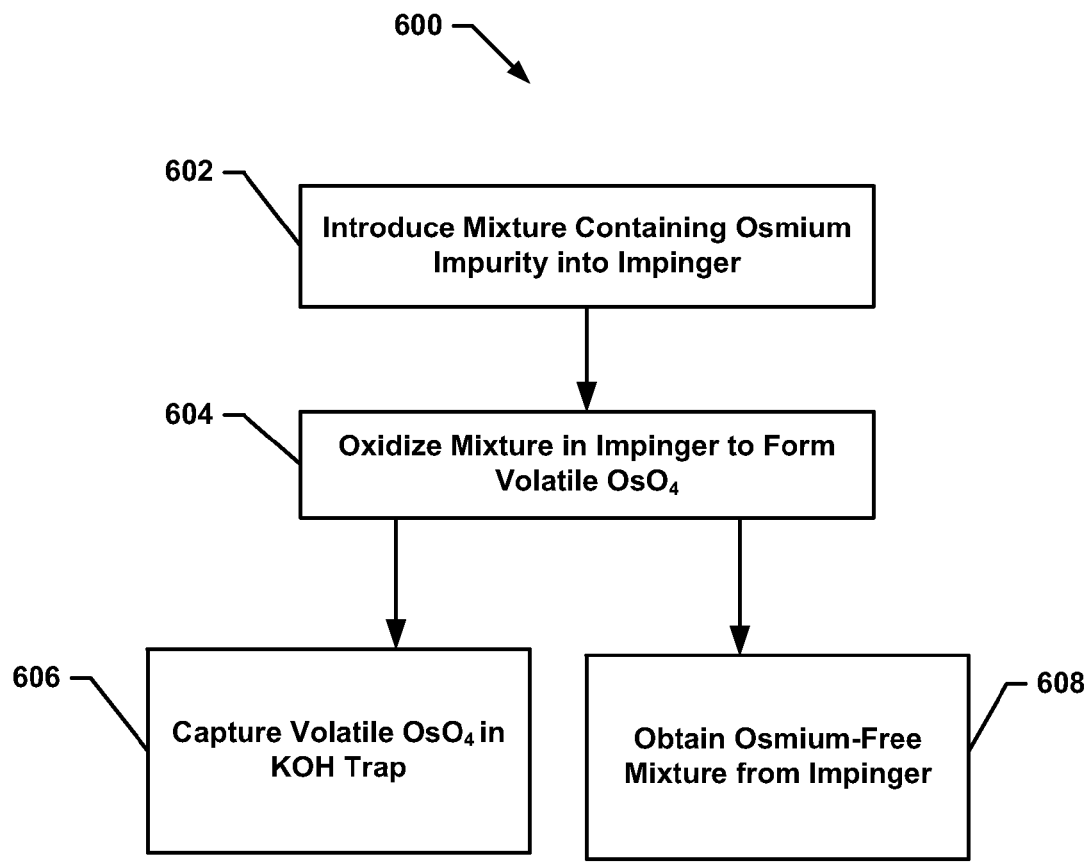
FIG. 6 is a flow chart illustrating a method of obtaining an osmium-free material from a mixture that includes an osmium impurity.

In another aspect, the osmium separation method may be used to separate an osmium impurity from a mixture including the osmium impurity and at least one other metal. A flowchart of this method 600 is illustrated in FIG. 6. In this aspect, the material source that includes the osmium impurity is introduced into the impinger at step 602. The mixture is dissolved and oxidized in the impinger at step 604, as described herein previously. The volatile $OsO_4$ vapor resulting from the oxidation of the osmium impurities may be trapped within the KOH trapping solution at step 606. This trapped osmium may be treated to reclaim the osmium or discarded, depending on the intended use of the osmium impurities.

In this aspect, the mixture that includes at least one other metal remains dissolved in the oxidizing solution in the impinger. In an aspect, the at least one other metal may be precipitated out of the oxidizing solution by contacting the oxidizing solution with a reducing agent at step 608 to produce an osmium-free mixture. The selection of reducing agent may depend on one or more of at least several factors including, but not limited to, the particular species of dissolved metal within the oxidizing solution.

In another aspect, if the oxidizing solution contains an amount of Re-186, the Re-186 may be separated from the oxidizing solution by contacting the oxidizing solution with an alumina chromatographic column, and eluting the Re-186 using a saline solution. In another aspect, a dissolved metal may be isolated from the oxidizing solution using electroplating methods.

Having described the invention in detail, it will be apparent that modifications and variations are possible. Those of skill in the art should, in light of the present disclosure, appreciate that many changes could be made in the specific embodiments that are disclosed and still obtain a like or similar result without departing from the spirit and scope of the invention, therefore all matter set forth is to be interpreted as illustrative and not in a limiting sense.

What is claimed is:

1. A method of separating an amount of osmium from a mixture comprising the amount of osmium and at least one additional metal, the method comprising:
    contacting the mixture with an oxidizing solution to form a volatile $OsO_4$ vapor;
    bubbling the $OsO_4$ vapor through a KOH trapping solution to form an amount of $K_2[OsO_4(OH)_2]$ dissolved in the KOH trapping solution;
    contacting the dissolved $K_2[OsO_4(OH)_2]$ with a reducing agent to form an Os precipitate; and
    separating the Os precipitate from the KOH trapping solution, wherein the mixture is an irradiated osmium metal target comprising at least one osmium isotope selected from the group consisting of Os-184, Os-186, Os-187, Os-188, Os-189, Os-190, and Os-192.

2. The method of claim 1, wherein:
    the mixture is an irradiated osmium metal target comprising at least one of Os-189, or Os-192; and
    the at least one additional metal comprises at least one of Re-186, Ir-186, Ir-187, Ir-188, or Ir-190.

3. A method of separating an amount of osmium from a mixture comprising the amount of osmium and at least one additional metal, comprising:
    contacting the mixture with an aqueous solution of NaClO at a concentration of about 12% w/v available chlorine to form a volatile $OsO_4$ vapor;
    bubbling the $OsO_4$ vapor through a trapping solution comprising an aqueous solution of KOH at a concentration of about 25% w/v to form an amount of dissolved $K_2[OsO_4(OH)_2]$;
    contacting the dissolved $K_2[OsO_4(OH)_2]$ with an aqueous solution of NaHS at a concentration of about 10% w/v to form an $OsS_2$ precipitate;
    washing the $OsS_2$ precipitate by agitating with water;
    separating the $OsS_2$ precipitate from the KOH trapping solution by centrifuging;
    rinsing the $OsS_2$ precipitate with acetone; and
    drying the $OsS_2$ precipitate;
    wherein the mixture is an irradiated osmium metal target comprising at least one osmium isotope selected from the group consisting of Os-184, Os-186, Os-187, Os-188, Os-189, Os-190, and Os-192.

4. The method of claim 3, wherein:
    the mixture is an irradiated osmium metal target comprising at least one of Os-189, or Os-192; and
    the at least one additional metal comprises at least one of Re-186, Ir-186, Ir-187, Ir-188, or Ir-190.

5. A method of separating an amount of osmium from a mixture comprising the amount of osmium and at least one additional metal, the method comprising:
    a. contacting the mixture with an oxidizing solution to form a volatile $OsO_4$ vapor;
    b. bubbling the $OsO_4$ vapor through a KOH trapping solution to form an amount of $K_2[OsO_4(OH)_2]$ dissolved in the KOH trapping solution;
    c. contacting the dissolved $K_2[OsO_4(OH)_2]$ with a reducing agent to form an Os precipitate; and
    d. separating the Os precipitate from the KOH trapping solution,
        wherein the oxidizing solution comprises an aqueous solution of an oxidizing agent chosen from NaClO, LiClO, KClO, $NaIO_4$, $Na_2S_4O_8$, $XeO_3$, $NaClO_2$, $NaClO_3$, $NaClO_4$, NaOH in contact with $Cl_2$ gas, alkali salts of ClO, $ClO_2$, $ClO_3$ and $ClO_4$, or combinations thereof.

6. The method of claim 5, wherein the mixture is an irradiated Os-190 metal target, the amount of osmium comprises an amount of Os-191, and the at least one additional metal is chosen from Ir-192, Ir-193, Ir-194, Pt-192, Pt-194, or combinations thereof.

7. The method of claim 5, wherein the oxidizing solution is an aqueous solution of NaClO at a concentration of about 12% w/v available chlorine.

8. The method of claim 7, wherein the mixture is contacted with the oxidizing solution in an impinger device.

9. The method of claim 7, wherein the mixture is contacted with the oxidizing solution at a temperature of about 40° C. until the mixture is dissolved, and the dissolved mixture is contacted with the oxidizing solution at a temperature of about 90° C.

10. The method of claim 5, wherein the KOH trapping solution comprises an aqueous solution of KOH at a concentration of about 25% w/v.

11. The method of claim 10, wherein the KOH trapping solution is maintained at a temperature of less than about 5° C.

12. The method of claim 5, wherein the reducing agent is chosen from absolute ethanol, Zn shavings, Al shavings, Mg shavings, $NaBH_4$, NaHS, $H_2S$ gas, $Na_2S_2O_3$, UV light, phosphine ligands, hydrazine, hydroquinone, hydrophosphorous acid, formaldehyde, hydroxylamine, or citrate.

13. The method of claim 12, wherein the reducing agent is absolute ethanol at a concentration of 5% v/v and the Os precipitate is $K_2[OsO_2(OH)_4]$.

14. The method of claim 12, wherein the reducing agent is a mixture of Zn shavings and Al shavings, and the Os precipitate is Os metal.

15. The method of claim 12, wherein the reducing agent is chosen from Zn shavings, Mg shavings, or Al shavings, the reducing agent is contacted with the dissolved $K_2[OsO_4(OH)_2]$ in combination with HCl, and the Os precipitate is Os metal.

16. The method of claim 12, wherein the reducing agent is $NaBH_4$ and the Os precipitate is Os metal.

17. The method of claim 12, wherein the reducing agent is chosen from NaHS, $H_2S$ gas, or $Na_2S_2O_3$ and the Os precipitate is $OsS_2$.

18. The method of claim 5, wherein a remaining mixture in the oxidizing solution is contacted with a reducing agent to form an osmium-free mixture comprising the at least one additional metal.

19. A method of separating an amount of osmium from a mixture comprising the amount of osmium and at least one additional metal, comprising:
   a. contacting the mixture with an aqueous solution of NaClO at a concentration of about 12% w/v available chlorine to form a volatile $OsO_4$ vapor;
   b. bubbling the $OsO_4$ vapor through a trapping solution comprising an aqueous solution of KOH at a concentration of about 25% w/v to form an amount of dissolved $K_2[OsO_4(OH)_2]$;
   c. contacting the dissolved $K_2[OsO_4(OH)_2]$ with an aqueous solution of NaHS at a concentration of about 10% w/v to form an $OsS_2$ precipitate;
   d. washing the $OsS_2$ precipitate by agitating with water;
   e. separating the $OsS_2$ precipitate from the KOH trapping solution by centrifuging;
   f. rinsing the $OsS_2$ precipitate with acetone; and
   g. drying the $OsS_2$ precipitate.

20. The method of claim 19, wherein the mixture is an irradiated Os-190 metal target, the amount of osmium comprises an amount of Os-191, and the at least one metal is chosen from Ir-192, Ir-193, Ir-194, Pt-192, Pt-194, or combinations thereof.

21. The method of claim 19, wherein the mixture is contacted with the aqueous solution of NaClO at a temperature of about 40° C. until completely dissolved, and the dissolved mixture is contacted with the aqueous solution of NaClO at a temperature of about 90° C.

22. The method of claim 21, wherein the dissolved mixture is contacted with the aqueous solution of NaClO until the aqueous solution of NaClO is colorless.

23. The method of claim 19, wherein the trapping solution is situated within an ice bath while the dissolved $K_2[OsO_4(OH)_2]$ is forming.

* * * * *